US010953605B2

(12) United States Patent
Tibbits et al.

(10) Patent No.: US 10,953,605 B2
(45) Date of Patent: Mar. 23, 2021

(54) ADDITIVE MANUFACTURING IN GEL-SUPPORTED ENVIRONMENT

(71) Applicants: Massachusetts Institute of Technology, Cambridge, MA (US); Steelcase Incorporated, Grand Rapids, MI (US)

(72) Inventors: Skylar J. E. Tibbits, Boston, MA (US); Christophe Guberan, La Praz (CH); Jared Smith Laucks, Cambridge, MA (US); Schendy G. Kernizan, Cambridge, MA (US); Kathleen Sofia Hajash, Somerville, MA (US); Bjorn Eric Sparrman, Somerville, MA (US); Paul Noll, Grand Rapids, MI (US)

(73) Assignee: Massachusetts Institute of Technology, Cambridge, Massachusetts and Steeicase Incorporated, Grand Rapids, MI (US)

( * ) Notice: Subject to any disclaimer, the term of this patent is extended or adjusted under 35 U.S.C. 154(b) by 250 days.

(21) Appl. No.: 15/945,704

(22) Filed: Apr. 4, 2018

(65) Prior Publication Data

US 2018/0281295 A1 Oct. 4, 2018

Related U.S. Application Data

(60) Provisional application No. 62/481,358, filed on Apr. 4, 2017.

(51) Int. Cl.
*B29C 64/40* (2017.01)
*B33Y 10/00* (2015.01)
(Continued)

(52) U.S. Cl.
CPC ............ *B29C 64/40* (2017.08); *B29C 64/106* (2017.08); *B29C 64/118* (2017.08); *B33Y 10/00* (2014.12);
(Continued)

(58) Field of Classification Search
None
See application file for complete search history.

(56) References Cited

U.S. PATENT DOCUMENTS 2,104,742 A 1/1938 Fleischer
2,414,716 A 1/1947 Carson
(Continued)

FOREIGN PATENT DOCUMENTS

AT 006 615 U1 1/2004
DE 20 2008 015 143 U1 3/2009
(Continued)

OTHER PUBLICATIONS

International Search Report and Written Opinion for International Application No. PCT/US2018/026144, titled: "Additive Manufacturing in Gel-Supported Environment;" dated Aug. 8, 2018.
(Continued)

*Primary Examiner* — Matthew J Daniels
*Assistant Examiner* — Paul Spiel
(74) *Attorney, Agent, or Firm* — Peter A. Nieves; Sheehan Phinney Bass & Green PA

(57) ABSTRACT

Described are methods for making three dimensional objects. A nozzle is positioned within a gel inside a container of gel. The position of the nozzle within the gel is changed while depositing solidifying material through the nozzle. The gel supports the solidifying material at the position at which the solidifying material is deposited. The solidifying material is solidified to form a solid material, which is a three-dimensional object.

3 Claims, 7 Drawing Sheets

(51) Int. Cl.
*B33Y 70/00* (2020.01)
*B33Y 30/00* (2015.01)
*B29C 64/106* (2017.01)
*B29C 64/118* (2017.01)
*B29K 105/04* (2006.01)
*B29K 83/00* (2006.01)

(52) U.S. Cl.
CPC .............. *B33Y 30/00* (2014.12); *B33Y 70/00* (2014.12); *B29K 2083/00* (2013.01); *B29K 2105/04* (2013.01); *B29K 2995/007* (2013.01)

(56) References Cited

U.S. PATENT DOCUMENTS

| | | |
|---|---|---|
| 2,490,586 A | 12/1949 | Embree |
| 2,680,501 A | 6/1954 | Cunningham |
| 2,765,159 A | 10/1956 | Garofalo |
| 3,019,552 A | 2/1962 | Schleich |
| 3,081,514 A | 3/1963 | Griswold |
| 3,125,195 A | 3/1964 | Moore |
| 3,389,451 A | 6/1968 | Speca et al. |
| 3,391,048 A | 7/1968 | Dyer et al. |
| 3,468,748 A | 9/1969 | Bassett |
| 4,107,870 A | 8/1978 | Ausnit |
| 4,205,152 A | 5/1980 | Mizuguchi et al. |
| 4,290,170 A | 9/1981 | Brookstein et al. |
| 4,575,330 A | 3/1986 | Hull |
| 4,674,580 A | 6/1987 | Schuh |
| 4,735,418 A | 4/1988 | Engel |
| 4,777,859 A | 10/1988 | Plummer, Jr. |
| 4,978,564 A | 12/1990 | Douglas |
| 5,281,181 A | 1/1994 | McCollum |
| 5,853,313 A | 12/1998 | Zheng |
| 5,928,803 A | 7/1999 | Yasuda |
| 6,012,494 A | 1/2000 | Balazs |
| 6,175,422 B1 | 1/2001 | Penn et al. |
| 6,264,199 B1 | 7/2001 | Schaedel |
| 6,569,373 B2 | 5/2003 | Napadensky |
| 7,007,370 B2 | 3/2006 | Gracias et al. |
| 7,160,612 B2 | 1/2007 | Magill et al. |
| 7,216,678 B2 | 5/2007 | Baer |
| 7,225,045 B2 | 5/2007 | Gothait et al. |
| 7,300,619 B2 | 11/2007 | Napadensky et al. |
| 7,500,846 B2 | 3/2009 | Eshed et al. |
| 7,575,807 B1 | 8/2009 | Barvosa-Carter et al. |
| 7,851,122 B2 | 12/2010 | Napadensky |
| 7,862,624 B2 | 1/2011 | Tran |
| 8,082,696 B2 | 12/2011 | Oliver |
| 8,424,249 B2 | 4/2013 | Oliver |
| 8,475,074 B1 | 7/2013 | Henry |
| 8,652,602 B1 | 2/2014 | Dolla |
| 8,992,183 B2 | 3/2015 | Perich et al. |
| 9,079,337 B2 | 7/2015 | Lipton et al. |
| D774,719 S | 12/2015 | Amarasiriwardena |
| 9,487,387 B2 | 11/2016 | MacCurdy et al. |
| 9,723,866 B2 | 8/2017 | Lipson et al. |
| 9,987,907 B1 | 6/2018 | Temchenko |
| 9,993,104 B2 | 6/2018 | Lipton et al. |
| 10,005,235 B2 | 6/2018 | Millar |
| 10,118,339 B2 | 11/2018 | Lipton et al. |
| 10,132,931 B2 | 11/2018 | MacCurdy et al. |
| 10,150,258 B2 | 12/2018 | Feinberg et al. |
| 10,166,726 B2 | 1/2019 | Fripp et al. |
| 10,259,161 B2 | 4/2019 | Lipton et al. |
| 10,513,089 B2 | 12/2019 | Tibbits et al. |
| 10,549,505 B2 | 2/2020 | Tibbits et al. |
| 10,633,772 B2 | 4/2020 | Tibbits et al. |
| 2002/0043950 A1 | 4/2002 | Yim et al. |
| 2002/0104973 A1 | 8/2002 | Kerekes |
| 2002/0116847 A1 | 8/2002 | Yen |
| 2002/0125790 A1 | 9/2002 | Horning et al. |
| 2003/0090034 A1 | 5/2003 | Mulhaupt et al. |
| 2003/0177749 A1 | 9/2003 | Jen |
| 2004/0197519 A1 | 10/2004 | Elzey et al. |
| 2004/0244309 A1 | 12/2004 | Rauc |
| 2005/0227560 A1 | 10/2005 | Allred, III |
| 2006/0016507 A1 | 1/2006 | Baer |
| 2006/0184231 A1 | 8/2006 | Rucker |
| 2006/0186700 A1 | 8/2006 | Browne et al. |
| 2007/0036964 A1 | 2/2007 | Rosenberger et al. |
| 2007/0106173 A1 | 5/2007 | Korotko et al. |
| 2007/0134486 A1 | 6/2007 | Bansal et al. |
| 2007/0163305 A1 | 7/2007 | Baer et al. |
| 2008/0027199 A1 | 1/2008 | Mazurek |
| 2008/0057809 A1 | 3/2008 | Rock |
| 2008/0066393 A1 | 3/2008 | Sorensen |
| 2008/0075850 A1 | 3/2008 | Rock |
| 2008/0075930 A1 | 3/2008 | Kornbluh et al. |
| 2008/0105324 A1 | 5/2008 | Baer |
| 2008/0109103 A1 | 5/2008 | Gershenfeld et al. |
| 2008/0234458 A1 | 9/2008 | West |
| 2008/0269420 A1 | 10/2008 | Tong |
| 2008/0282527 A1 | 11/2008 | Beck et al. |
| 2009/0176054 A1 | 7/2009 | Laib et al. |
| 2009/0218307 A1 | 9/2009 | Davies et al. |
| 2009/0233067 A1 | 9/2009 | Doornheim et al. |
| 2010/0168439 A1 | 7/2010 | Olson |
| 2010/0191360 A1 | 7/2010 | Napadensky et al. |
| 2010/0199582 A1 | 8/2010 | Oliver et al. |
| 2011/0285052 A1 | 11/2011 | Wigand et al. |
| 2012/0037263 A1 | 2/2012 | Malloy |
| 2012/0068378 A1 | 3/2012 | Swanson et al. |
| 2012/0091744 A1 | 4/2012 | McKnight et al. |
| 2012/0094060 A1 | 4/2012 | Gershenfeld et al. |
| 2012/0133080 A1 | 5/2012 | Moussa et al. |
| 2012/0137611 A1 | 6/2012 | Oliver |
| 2012/0308805 A1 | 12/2012 | Sella |
| 2013/0040091 A1 | 2/2013 | Dikovsky et al. |
| 2013/0073068 A1 | 3/2013 | Napadensky |
| 2013/0078415 A1 | 3/2013 | Rock |
| 2013/0089642 A1 | 4/2013 | Lipson et al. |
| 2013/0243997 A1 | 9/2013 | Spadaccini et al. |
| 2013/0246018 A1 | 9/2013 | Spadaccini et al. |
| 2013/0249981 A1 | 9/2013 | Nakagawa |
| 2014/0013962 A1 | 1/2014 | Lipton et al. |
| 2014/0037873 A1 | 2/2014 | Cheung et al. |
| 2014/0050811 A1 | 2/2014 | Lipton et al. |
| 2014/0059734 A1 | 3/2014 | Toronjo |
| 2014/0101816 A1 | 4/2014 | Toronjo |
| 2014/0265032 A1 | 9/2014 | Teicher et al. |
| 2014/0311187 A1 | 10/2014 | Amarasiriwardena et al. |
| 2015/0014881 A1 | 1/2015 | Elsey |
| 2015/0017411 A1 | 1/2015 | Wilkie et al. |
| 2015/0075033 A1 | 3/2015 | Cross et al. |
| 2015/0158244 A1 | 6/2015 | Tibbits et al. |
| 2015/0174885 A1 | 6/2015 | Khan |
| 2016/0009029 A1* | 1/2016 | Cohen .................. B29C 64/209 264/493 |
| 2016/0023403 A1 | 1/2016 | Ramos |
| 2016/0067918 A1 | 3/2016 | Millar |
| 2016/0101594 A1 | 4/2016 | Tibbits et al. |
| 2016/0121546 A1 | 5/2016 | Yao et al. |
| 2016/0208476 A1 | 7/2016 | Wadley et al. |
| 2016/0214321 A1 | 7/2016 | Tow et al. |
| 2016/0317939 A1 | 11/2016 | Fernandez et al. |
| 2016/0318255 A1 | 11/2016 | Ou et al. |
| 2016/0340814 A1 | 11/2016 | Ridley et al. |
| 2016/0340826 A1 | 11/2016 | Tibbits et al. |
| 2017/0042034 A1 | 2/2017 | MacCurdy et al. |
| 2017/0057704 A1 | 3/2017 | Li et al. |
| 2017/0106594 A1 | 4/2017 | Gardiner |
| 2017/0120535 A1 | 5/2017 | MacCurdy et al. |
| 2017/0145694 A1 | 5/2017 | Carney et al. |
| 2017/0182723 A1 | 6/2017 | Calisch et al. |
| 2017/0326785 A1 | 11/2017 | MacCurdy et al. |
| 2018/0021140 A1* | 1/2018 | Angelini .................. A61L 27/52 623/23.72 |
| 2018/0156204 A1 | 6/2018 | Lipton |
| 2018/0187337 A1 | 7/2018 | Iseki |
| 2018/0194106 A1 | 7/2018 | Tibbits et al. |
| 2018/0195213 A1 | 7/2018 | Tibbits et al. |
| 2018/0281295 A1 | 10/2018 | Tibbits et al. |
| 2018/0291535 A1 | 10/2018 | Ridley et al. |
| 2018/0311833 A1 | 11/2018 | Lipton et al. |

(56) References Cited

U.S. PATENT DOCUMENTS

| | | | |
|---|---|---|---|
| 2019/0039309 A1* | 2/2019 | Busbee | A43B 1/14 |
| 2019/0084282 A1 | 3/2019 | Prasad et al. | |
| 2019/0291350 A1 | 9/2019 | Feinberg et al. | |
| 2020/0016833 A1* | 1/2020 | Yuwaki | B33Y 40/10 |

FOREIGN PATENT DOCUMENTS

| | | |
|---|---|---|
| DE | 20 2009 000 527 U1 | 4/2009 |
| EP | 1274559 B1 | 1/2003 |
| FR | 1331581 A | 7/1963 |
| FR | 1243060 A | 10/1967 |
| FR | 2479923 | 4/1980 |
| FR | 2583334 A1 | 12/1986 |
| FR | 2956590 | 8/2011 |
| GB | 2455167 A | 6/2009 |
| JP | H07 42024 A | 2/1995 |
| WO | WO 00/69747 A1 | 11/2000 |
| WO | WO 01/78968 A1 | 10/2001 |
| WO | WO 2014/014892 A2 | 1/2014 |
| WO | WO 2014/025089 A1 | 2/2014 |
| WO | 2015017421 A2 | 2/2015 |
| WO | WO 2015/084422 A1 | 6/2015 |
| WO | WO 2015/139095 A1 | 9/2015 |
| WO | WO 2016/057853 A1 | 4/2016 |
| WO | WO 2017/079475 A1 | 5/2017 |
| WO | WO 2017/081040 A1 | 5/2018 |
| WO | WO 2018/088965 A1 | 5/2018 |
| WO | WO 2018/187514 A1 | 10/2018 |

OTHER PUBLICATIONS

3D Printing (Photolithography), MRSEC Education Group, University of Wisconsin-Madison. Accesed: Nov. 23, 2016.
A Brief History of 3D Printing, T. Rowe Price, 1 page (2012).
About Additive Manufacturing, Additive Manufacturing Research Group, Loughborough University, copyright 1016, http://www.lboro.ac.uk!research/amrg/about/the7categoriesofadditivemanufacturing/.
Ackerman, E. "This self-poofing fabric transforms from t-shirt to parka," IEEE Spectrum, Mar. 18, 2017.
Advanced Functional Fabrics of America (AFFOA) Project Call 1.0 Full Proposal, Jun. 2017.
Aguilera, E., et al., "3D Printing of Electro Mechanical Systems," 24th International SFF Symposium—an Additive Manufacturing Conference, SFF 2013, pp. 950-961 (2013).
Ahn, J-H., et al., "Heterogeneous Three-Dimensional Electronics by Use of Printed Semiconductor Nanomaterial," Science, 314: 1754-1757 (2006).
Akhavan, V., et al., "Reacting Thick-Film Copper Conductive Inks with Photonic Curing," 5 pages (2013).
Altan, T., et al., "Manufacturing of Dies and Molds," 19 pages (2001).
Anatomy & Physiology (Open + Free), Unit 5: Muscular System, Module 16, "Skeletal Muscle Organ Anatomy" (Mar. 18, 2018).
Anatomy & Physiology (Open + Free), Unit 6: Muscular System, Module 17, "Muscle Fiber Organization" (Mar. 18, 2018).
Armon, Shahaf et al., "Geometry and Mechanics in the Opening of Chiral Seed Pods," Science 333:1726-1730 (2011).
Bailey, S.A., et al., "Biomimetic Robotic Mechanisms via Shape Deposition Manufacturing," pp. 1-8 (2000).
Bartlett, Nicholas W., et al., "A 3D-printed, functionally graded soft robot powered by combustion," Science, 349(6244): 161-166 (Jul. 10, 2015).
Bendsøe, M.P. and Kikuchi, N., "Generating Optimal Topologies in Structural Desing Using a Homogenization Method," Comp. Meth. App. Mech. Eng., 71: 197-224 (1988).
Berman, B., "3-D Printing: The New Industrial Revolution," Business Horizons, 55: 155-162 (2012).
Bhargava, K. et al., "Discrete Elements for 3D Microfluidics," PNAS, 111(42): 15013-15018 (2014).
Bicchi, A. and Tonietti, G., "Fast and 'Soft-Arm' Tactics," IEEE Robotics & Automation Magazine, 22-33 (2004).
Blakely, Andrew M., "Bio-Pick, Place, and Perfuse: A New Instrument for 3D Tissue Engineering," Tissue Engineering: Part C, vol. 00, No. 00, pp. 1-10 (2015).
Borghino, D., "Voxel8 Paves the Way for 3D-Printed Electronics," Accessed at www.gizmag.com pp. 1-6 (Jan. 14, 2015).
Bruyas, A., et al., "Combining Multi-Material Rapid Prototyping and Pseudo-Rigid Body Modeling for a New Compliant Mechanism," 2014 IEEE International Conference on Robotics & Automation (ICRA), pp. 3390-3396 (2014).
Cali, J., et al., "3D-Printing of Non-Assembly, Articulated Models," ACM Trans. Graph., Article No. 130, 31(6): 1-8 (2012).
Cantatore, E., "Applications of Organic and Printed Electronics, a Technology-Enabled Revolution," Springer Publishers, ISBN No. 978-1-4614-3159-6, pp. 1-187 (2013).
Chandler, David L. Printing off the Paper. MIT News (2011); available at: http://web.mit.edu/newsoffice/2011/3d-printing-0914.html 4 pages, (last visited Mar. 3, 2014).
Cheney, N., et al., "Unshackling Evolution," SIGEVOlution, 7(1): 11-23 (2013).
Christenson, K.K., et al., "Direct Printing of Circuit Boards Using Aerosol Jet®," Tech. Prog. Proc., pp. 433-436 (2011).
Church, K., et al., "Commercial Applications and Review for Direct Write Technologies," Mat. Res. Soc. Symp. Proc., 624: 3-8 (2000).
Cityzen smart shirt tracks your health, recharges during washing—https://newatlas.com/cityzen-smart-shirt-sensing-fabric-health-monitoring/30428/ (Feb. 3, 2014).
Comber, D.B., et al., "Design, Additive Manufacture, and Control of a Pneumatic MR-Compatible Needle Driver," IEEE Trans. Rob., 1-12 (2015).
Coros, S., et al., "Computational Design of Mechanical Characters," 12 pages (2013).
De Laurentis, K.J., et al., "Procedure for Rapid Fabrication of Non-Assembly Mechanisms with Embedded Components," Proceedsing of DETC'02: ASME 2002 Design Engineering Technical Conferences and Computers and Information in Engineering Conference, pp. 1-7 (2002).
Derby, B., "Inkjet Printing of Functional and Structural Materials: Fluid Property Requirements, Feature Stability, and Resolution," Annu. Rev. Mater. Res., 40: 395-414 (2010).
Dimas, L.S., et al., "Tough Composites Inspired by Mineralized Natural Materials: Computation, 3D Printing, and Testing," Adv. Funct. Mater., 23(36): 1-10 (2013).
Doubrovski, E.L., et al., "Voxel-Based Fabrication Through Material Property Mapping: A Design Method for Bitmap Printing," Computer-Aided Design, 60: 3-13 (2015).
Dutta, D., et al., "Layered Manufacturing: Current Status and Future Trends," Trans. ASME, 1:60-71 (Mar. 2001).
Eaton, M., et al., "The Modelling, Prediction, and Experimental Evaluation of Gear Pump Meshing Pressures with Particular Reference to Aero-Engine Fuel Pumps," Proc. IMechE, 220 (Part 1): 365-379 (2006).
Espalin, D., et al., "3D Printing Multifunctionality: Structures with Elements," Int. J. Adv. Manuf. Technol., 72: 963-978 (2014).
Ferry, P.W., et al., "A Review on Stereolithography and Its Applications in Biomedical Engineering," Biomat., 31: 6121-6130 (2010).
Fuller, S.B., et al., "Ink-Jet Printed Nanoparticle Microelectromechanical Systems," J. Microelec. Sys., 11(1): 54-60 (2002).
Ge, Qi, et al., "Active materials by four-dimension printing," Applied Physics Letters 103:131901-131901-5 (2013).
Gong, H., et al., "High Density 3D Printed Microfluidic Valves, Pumps, and Multiplexers, Lab on a Chip" Royal Society of Chemistry, 9 pages (2016).
Grunewald, S., "Nano Dimension Unveils the DragonFly 2020, World's First Desktop Electronic 3D Printer," Downloaded from https://3DPrint.com, the Voice of 3D Printing Technologies, pp. 1-5 (Nov. 18, 2015).
Grzesiak, A., et al., "The Bionic Handling Assistant: A Success Story of Additive Manufacturing," Assemb. Autom., 31(4): 329-333 (2011).

(56) References Cited

OTHER PUBLICATIONS

Guan, Jingjiao, et al. "Self-Folding of Three-Dimensional Hydrogel Microstructures," *Journal of Physical Chemistry B* 109:23134-23137 (2005).
Hajash et al., Large-Scale Rapid Liquid Printing, 3D Printing and Additive Manufacturing, vol. 4, No. 3 (2017).
Hanuska et al., Smart Clothing Market Analysis (printed Aug. 20, 2019).
Hawkes et al. Programmable matter by folding, PNAS, vol. 107(28): 12441-12445 (2010).
Hexoskin Smart Shirts—https://www.hexoskin.com/ printed Aug. 20, 2019.
Hiller, J. and Lipson, H., "Automatic Design and Manufacture of Soft Robots," IEEE Trans. Rob., 28(2): 457-466 (2012).
Hiller, J. and Lipson, H., "Methods of Parallel Voxel Manipulation for 3D Digital Printing," pp. 200-211 (2007).
Hiller, J. and Lipson, H., "Tunable Digital Material Properties for 3D Voxel Printers," *Rapid Prototyping Journal*, 16(4): 241-247 (2009).
Hiller, J.D., et al., "Microbricks for Three-Dimensional Reconfigurable Modular Microsystems," *J. Microelec. Sys.*, 20(5): 1089-1097 (2011).
Huber, C., et al., 3D Print of Polymer Bonded Rare-Earth Magnets, and 3D Magnetic Field Scanning with an End-User 3D Printer, *Applied Physics Letters*, 109: 162401-1-162401-4 (2016).
Ionov, L., "Soft Microorigami: self-folding polymer films," *Soft Matter*, 7: 6786 (Published online May 24, 2011).
Janbaz, et al., Programming the shape-shifting of flat soft matter: from self-rolling/self-twisting materials to self-folding origami, Materials Horizones, Issue 6, pp. 534-547, Aug. 2016.
Jeffrey, C., "V-One Conductive Ink Printer Aims to Short-Circuit Electronic Prototyping," accessed on www.gizmag.com pp. 1-6 (Feb. 10, 2015).
Jeong, K-U. et al., "Three-dimensional actuators transformed from the programmed two-dimensional structures via bending, twisting and folding mechanisms," *Journal of Materials Chemistry*, 21: 6824-6830 (2011).
Jung et al. "Water-responsive shape memory polyurethane block copolymer modified with polyhedral oligomeric silsesquioxane." *Journal of Macromolecular Science*, Part B 45, 453 (2006).
Kang, H., et al., "Direct Intense Pulsed Light Sintering of Inkjet-Printed Copper Oxide Layers within Six Milliseconds," ACS Appl. Mater. Interfaces, 6:1682-1687 (2014).
Kanthal, Thermostatic Bimetal Handbook (2008).
Klein, Yael, et al. "Shaping of Elastic Sheets by Prescription of Non-Euclidean Metrics," *Science* 315:1116-1120 (2007).
Kolesky, D.B., et al., "3D Bioprinting of Vascularized, Heterogeneous Cell-Laden Tissue Constructs," Adv. Mater., 26:3124-3130 (2014).
Konaković et al. "Beyond developable: computational design and fabrication with auxetic materials," ACM Transactions on Graphics (TOG), vol. 35, Issue 4, Article No. 89 (Jul. 2016).
Kong, Y.L., et al., "3D Printed Quantum Dot Light-Emitting Diodes," Nano. Lett., 14:7017-7023 (2014).
Kruth, J.P., et al., "Progress in Additive Manufacturing and Rapid Prototyping," Annals CIRP, 47(2): 525-540 (1998).
Kuehn, T. and Rieffel, J., "Automatically Designing and Printing 3-D Objects with EvoFab 0.2," *Artificial Life*, 13: 372-378 (2012).
Laschi, C., et al., "Soft Robot Arm Inspired by the Octopus," *Adv. Rob.*, 26: 709-727 (2012).
Li, B., et al., "Robust Direct-Write Dispensing Tool and Solutions for Micro/Meso-Scale Manufacturing and Packaging," *ASME Proceedings of the 2007 International Maufacturing Science and Engineering Conference*, pp. 1-7 (2007).
Li, X., "Embedded Sensors in Layered Manufacturing," *Dissertation submitted to Stanford University*, pp. 1-152 (Jun. 2001).
Lin, H.-T., et al., "GoQBot: A Caterpillar-Inspired Soft-Bodied Rolling Robot," Bioinsp. Biomim., 6: 1-14 (2011).
Lipson, H., "Challenges and Opportunities for Design, Simulation, and Fabrication of Soft Robots," Soft Robotics, 1(1): 21-27 (2014).
Lipson, H., and Kurman, M., "Factory@Home—the Emerging Economy of Personal Manufacturing," One of a series of Occasional Papers in Science and Technology Policy, pp. 1-103 (Dec. 2010).
Lipton, J. et al., "Fab@Home Model 3: A More Robust, Cost Effective and Accessible Open Hardware Fabrication Platform," 125-135 (2012).
Liu, Ying, et al., Self-Folding by Local Light Absorption (Nov. 10, 2011); screenshots provided, full video available at: http://www.youtube.com/watch?v=NKRWZG67dtQ.
Liu, Ying, et al., "Self-folding of polymer sheets using local light absorption," *Soft Matter* 8(6):1764-1769 (2012).
Louis-Rosenberg, J., "Drowning in Triangle Soup: The Quest for a Better 3-D Printing File Format," *XRDS*, 22(3): 58-62 (2016).
MacCurdy, R., et al., "Bitblox: A Printable Digital Material for Electromechanical Machines," Int'l J. Robotics Res., 33(10), 1342-1360 (2014).
MacCurdy, R., et al., "Printable Hydraulics: A Method for Fabricating Robots by 3D Co-Printing Solids and Liquids," *2016 IEEE International Conference on Robotics and Automation (ICRA)*, pp. 1-8 (2016).
MacCurdy, R., et al., "Printable Programmable Viscoelastic Materials for Robots," *IEEE/RSJ International Conference on Intelligent Robots and Systems (IROS)*, pp. 1-8 (2016).
MacDonald, E., et al., "3D Printing for the Rapid Prototyping of Structural Electronics," *IEEE*, 2:234-242 (2014).
Macdonald, N.P., et al., "Assessment of Biocompatibility of 3D Printed Photopolymers Using Zebrafish Embryo Toxicity Assays," *Royal Society of Chemistry—Lab on a Chip*, 16: 291-297 (2016).
Mack, E., "Beyond 3D Printers and the Coming of the Home Electronics Factory," www.gizmag.com, pp. 1-5 (Oct. 22, 2014).
Malone, E., and Lipson, H., "Multi-Material Freeform Fabrication of Active Systems," *Proceedings of the 9th Biennial ASME Conference on Engineering Systems Design and Analysis*, pp. 1-9, (2008).
Mannoor, M.S., et al., "3D Printed Bionic Ears," *Nano. Lett.*, 13: 2634-2639 (2013).
Mao, Y., et al., "Scientific Reports: Sequential Self-Folding Structures by 3D Printed Digital Shape Memory Polymers," *Nature*, pp. 1-12 (2015).
Mao et al., "3D Printed Reversible Shape Changing Components with Stimuli Responsive Materials," Scientific Reports, Issue 6, Apr. 2016.
Marchese, Ad., et al., "A Recipe for Soft Fluidic Elastomer Robots," *Soft Robotics*, 2(1): 7-25 (2015).
Mehta, A., et al., "Cogeneration of Mechanical, Electrical, and Software Design for Printable Robots from Structural Specifications," *Int. Rob. Sys.*: 2892-2897 (2014).
Mehta, A., et al., "Integrated Codesign of Printable Robots," *J. Mech. Rob.*, 7: 1-10 (2015).
Meier et al., "An objective 3D large deformation finite element formulation for geometrically exact curved Kirchhoff rods," Computer Methods in Applied Mechanics and Engineering, Aug. 2014.
Meisel, N.A., et al., "A Procedure for Creating Actuated Joints via Embedding Shape Memory Alloys in Polyjet 3D Printing," *J. Intel. Mat. Sys. Struct.*, pp. 1-15 (2014).
Melchels, F. P.W., et al., "A review on stereolithography and its applications in biomedical engineering," *Biomaterials*, 31:6121-6130 (2010).
Men's Apollo Dress Shirt—White—Ministry of Supply, https://ministryofsupply.com/products/apollo-3-dress-shirt-white printed Aug. 20, 2019.
Merz, R, "Shape Deposition Manufacturing," *Proceedings of the Solid Freeform Fabrication Symposium, the University of Texas at Austin*, pp. 1-7 (1994).
Merz, R, et al., Dissertation entitled "Shape Deposition Manufacturing," pp. 1-190 (1994).
Mironov, V., et al., "Organ Printing: Computer-Aided Jet-Based 3D Tissue Engineering," *Trends Biotech.*, 21(4):157-161 (2003).
MIT Media Lab—Tangible Media Group—bioLogic—https://tangible.media.mit.edu/project/biologic/ printed Aug. 20, 2019.
Morin, S.A., et al., "Using Click-e-Bricks to Make 3D Elastomeric Structures," Adv. Mater., 26:5991-5999 (2014).

(56) References Cited

OTHER PUBLICATIONS

Mueller, S., et al., "faBrickation: Fast 3D Printing of Functional Objects by Integrating Construction Kit Building Blocks," *Session: 3D Printing and Fabrication*, 3827-3834 (2014).

Mueller, S., et al., "Mechanical Properties of Parts Fabricated with Inkjet 3D Printing Through Efficient Experimental Design," *Materials and Design*, 86:902-912 (2015).

Murphy, S.V. and Atala, A., "3D Bioprinting of Tissues and Organs," *Nat. Biotech.*, 32(8):773-785 (2014).

Murray, C., "Smart Actuator Propels Hydraulic 'Beast of Burden'", Design News [online], Jun. 4, 2015 [retrieved Oct. 21, 2016]. Retrieved from the Internet URL: http://www.designnews.com/document.asp?doc_id=277754.

Nayakanti et al. "Twist-coupled kirigami cellular metamaterials and mechanisms," arXiv:1707.03673v1 [physics.app-ph] (2017).

Nike HyperAdapt. Self-Lacing Shoes—https://www.nike.com/us/en_us/c/innovation/hyperadapt printed Aug. 20, 2019.

O'Donnell, J., et al., "A Review on Electromechanical Devices Fabricated by Additive Manufacturing," *J. of Manufacturing Science and Engineering*, pp. 1-45 (2015).

Palmer, J.A., et al., "Realizing 3-D Interconnected Direct Write Electronics within Smart Stereolithography Structures," *Proceedings of IMECE2005—2005 ASME International Mechanical Engineering Congress and Exposition*, pp. 1-7 (2005).

Papadopoulou et al., "Auxetic materials in design and architecture," Nature Reviews—Materials, 2:17078, Dec. 5, 2017.

Papadopoulou et al., "Heat-active auxetic materials," in Active Matter, MIT Press (2017).

Park, S., et al., "Self-Assembly of Mesoscopic Metal-Polymer Amphiphiles," *Science*, 303:348-351 (2004).

Peele, B.N., et al., "3D Printing Antagonistic Systems of Artificial Muscle Using Projection Stereolithography," *Bioinspir. Biomim.*, 10:1-8 (2015).

Popescu, G. A., et al., "Digital Materials for Digital Printing," *Soc. Imaging Sci. Tech.*, pp. 58-61 (2006).

Popescu, G.A., "Digital Materials for Digital Fabrication," Thesis submitted to Massachusetts Institute of Technology, pp. 1-53 (Aug. 20, 2007).

Proto3000: "3D Printed Snow Globe by Proto3000—Thingiverse," Retrieved from the internet: http://www.thingiverse.com/thing:225572, Retrieved on: Jan. 10, 2017.

Raviv, et al., Active Printed Materials for Complex Self-Evolving Deformations, Scentific Reports, Issue 6, Dec. 2014.

Review: The Arrow Smart Shirt—https://www.livemint.com/Leisure/RTUZItGjlnEBffdPTYJFEN/Review-The-Arrow-Smart-Shirt.html printed Aug. 20, 2019.

Rost, A., and Schädle, S., "The SLS-Generated Soft Robotic Hand—an Integrated Approach Using Additive Manufacturing and Reinforcement Learning," IEEE: 215-220 (2013).

Rus, D. and Tolley, M.T "Design, Fabrication and Control of Soft Robots," *Nature*, 521: 467-475 (2015).

Russo, A., et al., "Pen-On-Paper Flexible Electronics," *Adv. Mater.*, 23: 3426-3430 (2011).

Saari, M., et al., "Fiber Encapsulation Additive Manufacturing: An Enabling Technology for 3D Printing of Electromechanical Devices and Robotic Components," *3D Printing*, 2(1):32-39 (2015).

Safari, A., et al., "Solid Freeform Fabrication of Piezoelectric Sensors and Actuators," *J. Mat. Sci.*, 41: 177-198 (2006).

Salch, E., et al., "3D Inkjet-Printed UV-Curable Inks for Multi-Functional Electromagnetic Applications," *Proceedings of ISFA2014*, pp. 1-5 (2014).

Sangani, K., "How to . . . Print Gadgets," *Engineering & Technology*, pp. 58-60 (2013).

Santulli, C. & Langella, C. "Study and development of concepts of auxetic structures in bio-inspired design," Int. J.Sustainable Design, 3:1 (2016).

Sharmis Passions, "Eggless Chocolate Cake—Moist Chocolate Cake Recipe (No eggs No butter)," http://www.sharmispassions.com/201 0/03/simple-moistchocolate-cakewith-no-eggs. html, pp. 1-37 (posted Mar. 27, 2010).

Sharon, Eran and Efrati, Efi., "The mechanics of non-Euclidean plates," *Soft Matter* 6:5693-5704 (2010).

Sharon, Eran et al., "Leaves, Flowers and Garbage Bags: Making Waves," *American Scientist* 92:254-261 (2004).

Sharon, Eran., "Swell Approaches for Changing Polymer Shapes," *Science* 335:1179-1180 (2012).

Sitthi-Amorn, P., et al., "MultiFab: A Machine Vision Assisted Platform for Multi-Material 3D Printing," *ACM Transactions on Graphics, Article No. 129*, 34(4): 1-11 (2015).

Slightam, J.E. and Gervasi, V.R., "Novel Integrated Fluid-Power Actuators for Functional End-Use Components and Systems via Selective Laser Sintering Nylon 12," *23rd Ann Int Solid Freeform Fabrication Symp*: pp. 197-211 (2012).

Slotwinski, J.A., "Materials Standards for Additive Manufacturing," *National Institute of Standards and Technology (NISI), PDES, Inc. Workshop* (Mar. 14, 2013).

Snyder, T.J., et al., "3D Systems' Technology Overview and New Applications in Manufacturing, Engineering, Science, and Education," *Mary Ann Liebert, Inc.*, 1(3):169-176 (2014).

Tabuchi, H. "Products and competition stretch market for 'athleisure' clothing," The New York Times, Mar. 25, 2016.

Takatsu, H., et al., "Stress Analysis Method of U-Shaped Bellows and Its Experimental Verification," *Fusion Eng. & Des.*, 22: 239-250 (1993).

Tanaka, M., "Fatigue Life Estimation of Bellows Based on Elastic-Plastic Calculations," *Int. J. Pres. Ves. & Piping*, 2: 51-68 (1974).

Thomaszewski, B., et al., "Computational Design of Linkage-Based Characters," 9 pages (2014).

Thryft, Ann R., "3D Printing Now Good Enough for Final & Spare Car Parts," downloaded from www.designnews.com, 3 pages, (Jul. 22, 2016).

Tibbets, S. and Cheung, K., "Programmable Materials for Architectural Assembly and Automation," *Assembly Automation*, 32(3): 216-225 (2012).

Tibbits, Skylar J.E,. "4D Printing: Multi-Material Shape Change," *Architectural Design Journal* 84:116-121 (2014).

Tibbits, S., "4D Printing: Self-Assembling Parts in Action at TED2013," by Stratasys Staff, Apr. 29, 2013.

Tibbits, Skylar., "Design to Self Assembly," *Architectural Design Journal* 82(2):68-73 (2012).

Tibbits, Skylar., "The Emergence of 4D Printing," TED Talk filed in Feb. 2012; transcript provided, 6 pages, video available at http://www.ted.com/talks/skylar_tibbits_the_emergence_of_4d_printing.html.

Tolley, M.T., et al., "A Resilient, Untethered Soft Robot," *Soft Robotics*, 1(3): 213-223 (2014).

Torrisi, F., et al, "Inkjet-Printed Graphene Electronics," *Am. Chem. Soc.*, 6(4): 2992-3006 (2012).

Touloukian et al., Thermophysical Properties of Matter, vols. 12, Thermal Expansion Metallic Elements and Alloys (1975) (selected pages).

Touloukian et al., Thermophysical Properties of Matter, vol. 13, Thermal Expansion Nonmetallic Solids (1977) (selected pages).

Tumbleston, J.R., et al., "Continuous Liquid Interface Production of 3D Objects," Research Reports, 347(6228): 1349-1353 (2015).

Tunisianswife, Easy Chocolate Bundt Cake Glaze (allrecipies.com accessed Jun. 6, 2016) http://all recipes. com/recipe/1 00335/easy -choco late-bu ndt -cake-glaze/.

Ultem®/PEI (Polyetherimide): Aetna Plastics, Accessed: Jun. 1, 2016.

Waheed, S., "3D Printed Microfluidic Devices: Enablers and Barriers," Royal Society of Chemistry, Lab on a Chip, 16: 1993-2013 (2016).

Walker, S.B. and Lewis, J.A., "Reactive Silver Inks for Patterning High-Conductivity Features at Mild Temperatures," Am. Chem. Soc., 134: 1419-1421 (2012).

Wang, L., et al., "Robotic Folding of 2D and 3D Structures from a Ribbon," IEEE International Conference on Robotics and Automation (ICRA), pp. 3655-3660 (2016).

Weiss, L., et al., "Shape Deposition Manufacturing of Wearable Computers," pp. 31-38 (1996).

Weiss, L.E., et al., "Shape Deposition Manufacturing of Heterogeneous Structures," J. Manu. Sys., 16(4): 239-248 (1997).

(56) References Cited

OTHER PUBLICATIONS

Westbrook, K.K., et al., "A 3D finite deformation constitutive model for amorphous shape memory polymers: A multi-branch modeling approach for nonequilibrium relaxation processes," *Mechanics of Materials* 43:853-869 (2011).
Whitney, J. P., et al., "A Low-Friction Passive Fluid Transmission and Fluid-Tendon Soft Actuator," 8 pages (2014).
Willis, K.D.D., et al., "Printed Optics: 3D Printing of Embedded Optical Elements for Interactive Devices," UIST' 12, pp. 589-598 (Oct. 2012).
Wu, S-Y., et al., "3D-Printed Microelectronics for Integrated Circuitry and Passive Wireless Sensors," Microsystems & Nanoengineering, 1:1-9 (2015).
Xia, Fan and Jiang, Lei., "Bio-Inspired, Smart, Multiscale Interfacial Materials," *Advanced Materials* (20):2842-2858 (2008).
Xie, T., "Tunable polymer multi-shape memory effect," Nature Letters, 464: 267-270 (2010).
Xu, S., et al., "Soft Microfluidic Assemblies of Sensors, Circuits, and Radios for the Skin," Science, 344: 70-74 (2014).
Yap, H.K., et al., "High-Force Soft Printable Pneumatics for Soft Robotic Applications," Soft Robotics, 3(3): 144-158 (2016).
Younsheng, L. and Shuiping, S., "Strength Analysis and Structural Optimization of U-Shaped Bellows," Int. J. Pres. Ves. & Piping, 42: 33-46 (1990).
International Preliminary Report on Patentability for International Application No. PCT/US2018/026144, titled: "Additive Manufacturing in Gel-Supported Environment;" dated Oct. 17, 2019.
Auxetic 3D honeycomb, Retrieved from the Internet at: https://youtu.be/2WkFSlwYWLA>, 1 page (2015).
Bouten, S., "Transformable Structures and their Architectural Application," Universiteit Gent, Department of Structural Engineering, 196 pages (2015).
Clark, Liat, "How hair gel enables freeform 3D printing with an undo function," Retrieved from the Internet at: https://www.wired.co.uk/article/undo-3d-printing, Retrieved from the Internet on: Mar. 22, 2019, 11 pages.
Fairs, Marcus, Dezeen: "SCI-Arc student develops freeform 3D printing with "undo" function," Retrieved from the Internet at: https://www.dezeen.com/2013/07/23/sci-arc-student-develops-freeform-3d-printing-with-undo-function/, Retrieved from the Internet on: Oct. 8, 2019, 16 pages.
Farahi, B., "Caress of the Gaze: A Gaze Actuated 3D Printed Body Architecture," Oct. 2016, 10 pages (2016).
Gatt, R., et al.. "On the behaviour of bi-material strips when subjected to changes in external hydrostatic pressure," Scripta Materialia, 60: 65-67 (2009).
Ge, Q. et al., "Active origami by 4D printing," Smart Materials and Structures, 23(9): 1-15 (2014).
Ghiuzan, "Deployable Structures," Retrieved from the Internet at: https://youtu.be/E-IqvGAfQ68>, 1 page (2016).
Neville, R.M. et al., "Shape morphing Kirigami mechanical metamaterials," Scientific Reports, 6, 12 pages (2016).
Rossiter, J. et al., "Shape memory polymer hexachiral auxetic structures with tunable stiffness," Smart Materials and Structures, 23: 1-11 (2014).
"Suspended Depositions," NSTRMNT, Retrieved from the Internet at: nstrmnt.com/#/suspended-depositions/, Retrieved from the Internet on: Oct. 8, 2019, 5 pages.
Tu Delft, "4D Printing for Freeform Surfaces: Design Optimization of Origami Structures," Retrieved from the Internet at: https://youtu.be/vQB49vNFu14>, 1 page (2015).
Xu, H., "Structurally Efficient Three-dimensional Metamaterials with Controllable Thermal Expansion," Scientific Report, 6, 8 pages (2016).
Zhang, Q. et al., "Pattern Transformation of Heat-Shrinkable Polymer by Three-Dimensional (3D) Printing Technique," Scientific Reports, 5: 1-6 (2015).
Zhang, Q. et al., "Smart three-dimensional lightweight structure triggered from a thin composite sheet via 3D printing technique," Scientific Reports, 6, 8 pages (2016).
Hinton, et al; "3D Printing PDMS Elastomer in a Hydrophilic Support Bath via Freeform Reversible Embedding"; ACS Biomaterials Science and Engineering, May 2016.
Pearce. A novel approach to obviousness: An algorithm for identifying prior art concerning 3D printing material. World Patent Information, 42, 13-18(2015).†

\* cited by examiner
† cited by third party

ADDITIVE MANUFACTURING IN GEL-SUPPORTED ENVIRONMENT

RELATED APPLICATION

This application claims the benefit of U.S. Provisional Application No. 62/481,358, filed on Apr. 4, 2017. The entire teachings of the above application are incorporated herein by reference.

BACKGROUND

Traditional manufacturing typically involves molded production of parts and other components having a fixed shape, and those individual components are frequently assembled into more complex structures. The process is often expensive and can involve a significant amount of manual labor, and molds used in the production are expensive to manufacture and have singular design structure.

Additive manufacturing refers to a collection of techniques for making three dimensional objects by layerwise addition of material. Stereolithography (SLA) is an additive manufacturing technique that involves selective photopolymerization of polymers upon exposure to UV light.

Selective laser sintering (SLS), direct metal laser sintering (DMLS), and laser melting (SLM) are additive manufacturing techniques that involve distributing a thin layer of a powder onto a substrate plate. In SLS and DMLS, a laser selectively sinters the powder. In SLM, a laser selectively melts the powder. Unlike SLA, which is typically used with polymers, SLS, DMLS, and SLS can be used with metals.

Fused deposition modeling (FDM), sometimes referred to as fused filament fabrication (FFF), an object is built by selectively depositing melted material in a pre-determined path layer-by-layer.

One problem with existing technologies is that they are too slow. Another problem with existing technologies is that manufacturing complex geometries, such as unsupported overhangs, can require fabricating a support structure that is subsequently removed during post-processing. Fabricating support structures often increases the cost of designing a part, and can lead to increased machine time to fabricate the part. In addition, some or all of the support structure is discarded, which increases the cost of materials to fabricate the part.

SUMMARY

The methods described herein pertain to additive manufacturing techniques that can be used to make three dimensional objects.

Described herein is a method of making a three-dimensional object. The method can include positioning a nozzle within a gel inside a container of gel; changing the position of the nozzle within the gel while depositing solidifying material through the nozzle, whereby the gel supports the solidifying material at the position at which the solidifying material is deposited; and solidifying the solidifying material to form a solid material, the solid material being a three-dimensional object.

Depositing the solidifying material through the nozzle can further include varying a rate at which the solidifying material is deposited, for example by varying pressure applied to one or more pistons to extrude the solidifying material. Changing the position of the nozzle within the gel can further include changing the position of the nozzle at varying speeds.

The nozzle can be affixed to a multi-axis machine. Changing the position of the nozzle through the gel can include moving one or more axes of the multi-axis machine to which the nozzle is affixed. Changing the position of the nozzle within the gel can include changing a position of the container of gel.

Solidifying the solidifying material can include exposing the solidifying material to light or heat. Solidifying the solidifying material can include allowing the solidifying material to cool. Solidifying the solidifying material can include exposing the solidifying material to light while depositing the solidifying material through the nozzle.

The solidifying material can be a polymer, a rubber, a pulp, a foam, a metal, a concrete, or an epoxy resin. The rubber can be a silicone rubber.

The solidifying material can have a hardness between about Shore 00-10 and about Shore 90D when solidified.

The solidifying material can be a foam. The solidified foam can have a density of about 3 $lb/ft^3$ to about 30 $lb/ft^3$.

The gel can be a suspension. The gel can include a carbomer or a polyacrylic acid. The gel can have a viscosity between about 20000 centipoise and about 50000 centipoise.

The nozzle can have a circular-shaped, rectangular-shaped, square-shaped, diamond-shaped, V-shaped, U-shaped, or C-shaped tip through which the solidifying material is deposited.

The solidifying material can include two compounds that co-polymerize. Solidifying the solidifying the solidifying material can include allowing the two compounds to co-polymerize. The nozzle further include a mixing portion that mixes the two compounds as they are deposited through the nozzle.

Changing the position of the nozzle can include changing the position of the nozzle within the gel in three through eight axes simultaneously, for at least a portion of time. Changing the position of the nozzle can include changing the position of the nozzle within the gel in five through eight axes simultaneously, for at least a portion of time. Changing the position of the nozzle include changing the position of the nozzle within the gel in three through six axes simultaneously, for at least a portion of time. Changing the position of the nozzle can include changing the position of the nozzle within the gel in six axes simultaneously, for at least a portion of time.

Changing the position of the nozzle can include changing the position of the nozzle to deposit solidifying material onto, around, or within another object within the gel.

The nozzle can be a first nozzle, the solidifying material can be a first solidifying material, and the solid material can be a first solid material. The method can further include positioning a second nozzle within the gel inside the container of gel; changing the position of the second nozzle within the gel while depositing a second solidifying material through the second nozzle, whereby the gel supports the second solidifying material at the position at which the second solidifying material is deposited, and whereby depositing the first and second solidifying materials is performed so that the first and second materials contact each other in deposited state; and solidifying the second solidifying material to form a second solid material, whereby the first and second solid materials are joined together as the three-dimensional object. The first and second nozzles can have tips with different shapes. The first and second solidifying materials can be different.

Described herein is an apparatus for making a three-dimensional object. The apparatus can include a nozzle affixed to a multi-axis machine; a means for extruding a solidifying material through the nozzle; and a container of gel.

The apparatus can be configured as described herein to perform the methods described herein.

The methods described herein confer a number of advantages. Notably, the methods are fast. Compared to other additive manufacturing processes, such as FDM and SLM, printing in a gel suspension in the disclosed embodiments of the additive manufacturing methods and systems described herein can be much faster, potentially orders of magnitude faster, for printing parts with complex geometries, such as those illustrated in FIG. 4. In some instances, the methods may be 300× faster, or more, than existing processes. Since it is not necessary to deposit support structures, post-processing of a manufactured object is substantially reduced. For example, post-processing can simply include washing the object in water. It is not necessary to cut away or otherwise remove support structures manually. The methods can also be used to manufacture large objects. The size of the container of gel is the only factor that limits the size of the object that can be manufactured.

Even though speed and size can be increased compared to known techniques, the manufactured objects are of a high quality. The solidifying materials that can be used in the methods described herein can be industrial-grade materials. For example, the methods described herein can be used to fabricate objects with silicone rubbers, whereas other methods may require the use of elastomers that are not truly silicones. The methods can also be used to fabricate materials from foams. The methods can also be used to fabricate materials from rigid polymers, whereas other methods may require sintering powders, and the resulting objects may have inferior mechanical properties. Since the methods described herein do not require layer-by-layer deposition, the objects that are formed do not have stratified layers, which can be mechanically inferior to a product that is formed of a homogenous cross-section.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1:
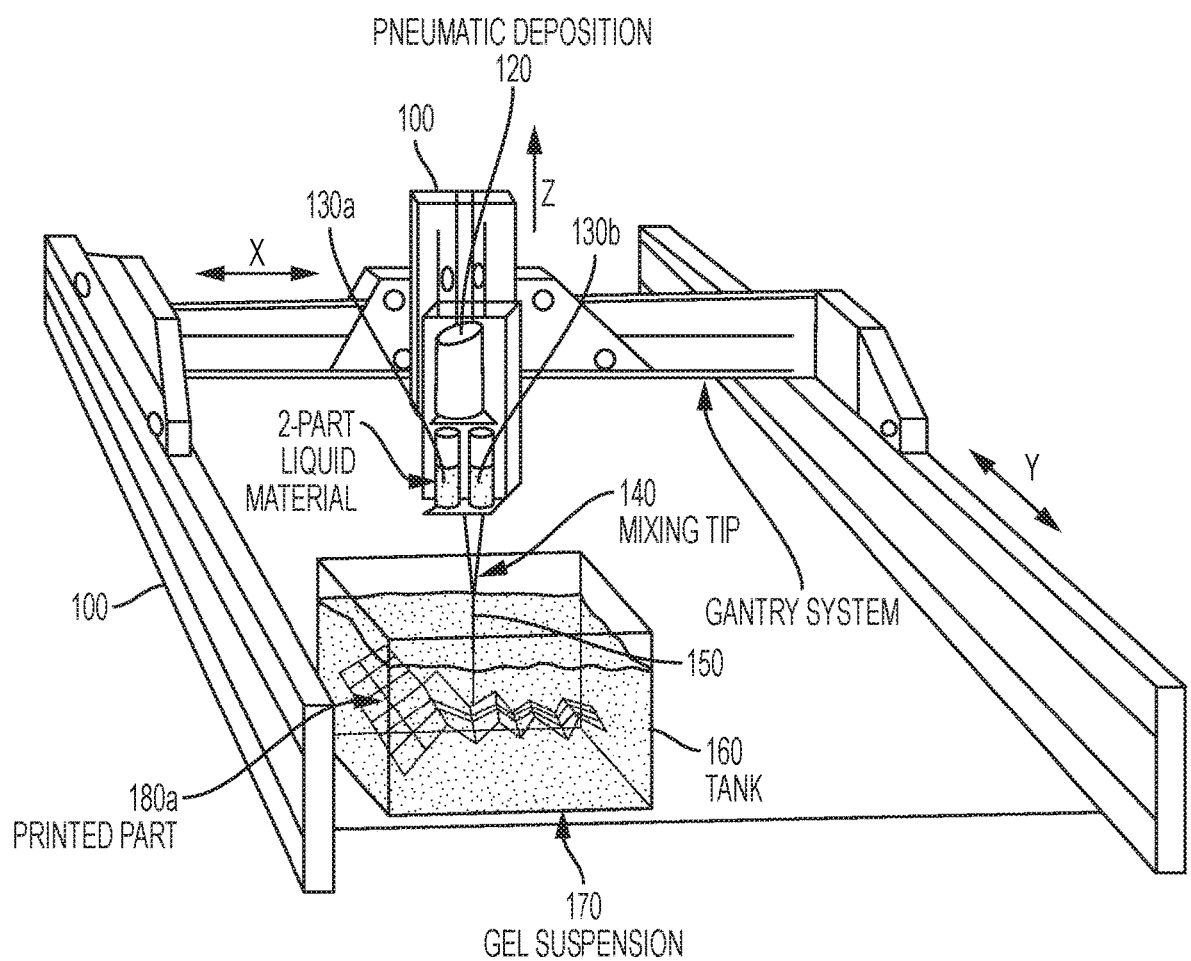
FIG. 1 illustrates a 3-axis gantry-style machine with a 2-part mixing deposition system printing a 3-dimensional part in a gel suspension.

A description of example embodiments follows.

As used herein, the term "gel" refers to a colloid in which particles are dispersed in a liquid medium. Most commonly, the dispersed particles are cross-linked particles. The gels can be thixotropic. Most gels are predominantly liquid by weight, but exhibit solid-like material properties due to the three-dimensional cross-linked network within the liquid.

The methods described herein pertain to a method of additive manufacturing within a gel suspension environment. Typically, the gel is held within a container. A solidifying material, which can be a molten or liquid form, is deposited with through nozzles and tool paths.

In some embodiments, a multi-axis machine be used to control a path of a nozzle through the gel. Examples of a multi-axis machines include gantry-type systems and industrial robot arms. In general, a wide variety of multi-axis machines and robotic arms are available. Gantry-style machines typically provide for three axes of movement: the x-, y-, and z-axes. Frequently, robotic arms are described according to the number of axes of rotation the arm possesses. For example, a five-axis robotic arm can rotate at five distinct axes of rotation, and a six-axis robotic arm can rotate at six distinct axes of rotation. In additional to rotational axes, a robotic arm can also be affixed to a linear rail or gantry-style machine to provide linear axes of movement in addition to the rotational axes. As an example, a six-axis robotic arm affixed to a linear rail can move in seven axes. As another example, a six-axis robotic arm affixed to a gantry-style machine can move in seven, eight, or nine axes, depending on the particular movements of the gantry-style machine.

In addition to axes of movement provided by a multi-axis machine, the container holding the gel can also be moved. For example, the container of gel can be placed on a multi-axis gantry-style machine, which can move the container of gel in three axes that are separate and distinct from axes of movement of the multi-axis machine to which the nozzle is affixed. The container of gel can also be moved along a rotational axis as well.

In some embodiments, the container of gel moves along one axis and the nozzle moves along two axes. In some embodiments, the nozzle is stationary, and the tank moves along two or three axes. In some embodiments, the tank is controlled by a gantry-style machine In some embodiments, the nozzle is controlled by a winch robot, which can also be referred to as a cable robot. In these embodiments, a plurality of cables control movement of the nozzle in the x-, y-, and z-directions.

The combination of these components allows for extremely fast printing with a variety of materials. For example, molten polymers can be deposited through the nozzle and solidified. For example, curing can include polymerization, which can be photoinitiated. In other embodiments, a polymer can be heated to accelerate a polymerization reaction rate. Chemically-cured, photo-cured or air/water-cured plastics, rubbers, foams and other liquids can be printed at large-scales only limited by the size of the container or robotic apparatus. Different nozzles can be used to control the flow rate, size, direction and cross-sectional geometry. Similarly, complex 3-dimensional tool paths can be created to print in any orientation and direction in 3D space.

Existing additive manufacturing processes have had limited industrial applications due to their lack of speed and size compared with other industrial manufacturing processes. The methods described herein can increase the speed of printing by using a gel suspension that does not require support materials nor slow printing speeds while waiting for the material to harden, like other 3-dimensional printing processes. Manufacturing speed is also increased because the objects are not produced layer-by-layer, as in other additive manufacturing processes (e.g., FDM, inkjet-like printing using liquid binder and powder (e.g., as available from ZCorp, acquired by 3D Systems), SLA, SLS, and Polyjet printing (e.g., CONNEX printers available from Stratasys Ltd)) that require excessive time to print large structures. Rather, parts can be printed in three-dimensional space.

Figure 4:
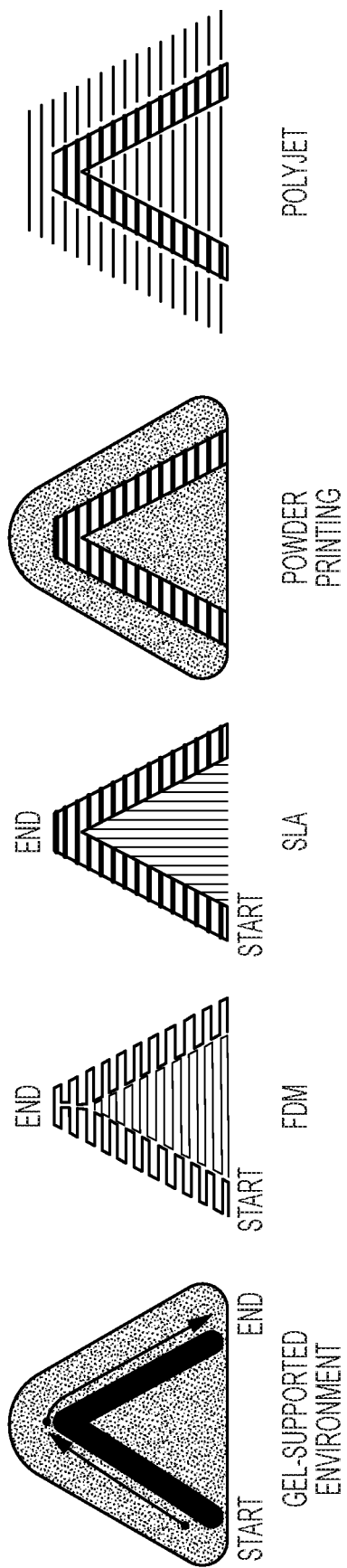
FIG. 4 illustrates a comparison between different printing processes for the same diagonally-shaped part.

FIG. 4 illustrates a comparison between different additive manufacturing printing process for the same diagonally-shaped part. In FDM printing, the part is divided into horizontal slices, and there is a horizontally sliced support region printed to support the overhanging portion. In SLA printing, the part is sliced horizontally and small vertical supports are printed to support the overhanging portion. In a powder-based system (e.g., SLS or ZCorp), the part is sliced horizontally and the surrounding powder supports the overhanging portion. In the gel-supported environment methods described herein, the part is printed directly in the orientation of the component, without horizontal slicing, effectively increasing the speed of printing and structural continuity of the part, and the surrounding gel acts at the support material.

Post-processing time is also dramatically decreased because supports structures are not necessary. Traditionally, these support structures are manually removed or dissolved. In the method, printing time is only limited by the speed of the machine and curing time of the deposited solidifying material (from seconds to hours depending on the composition).

The scale of printing can vary. Extremely small scale structures with fine features can be made by using a smaller nozzle tips. Larger structures with larger features can be made by using a larger nozzle.

Figure 2:
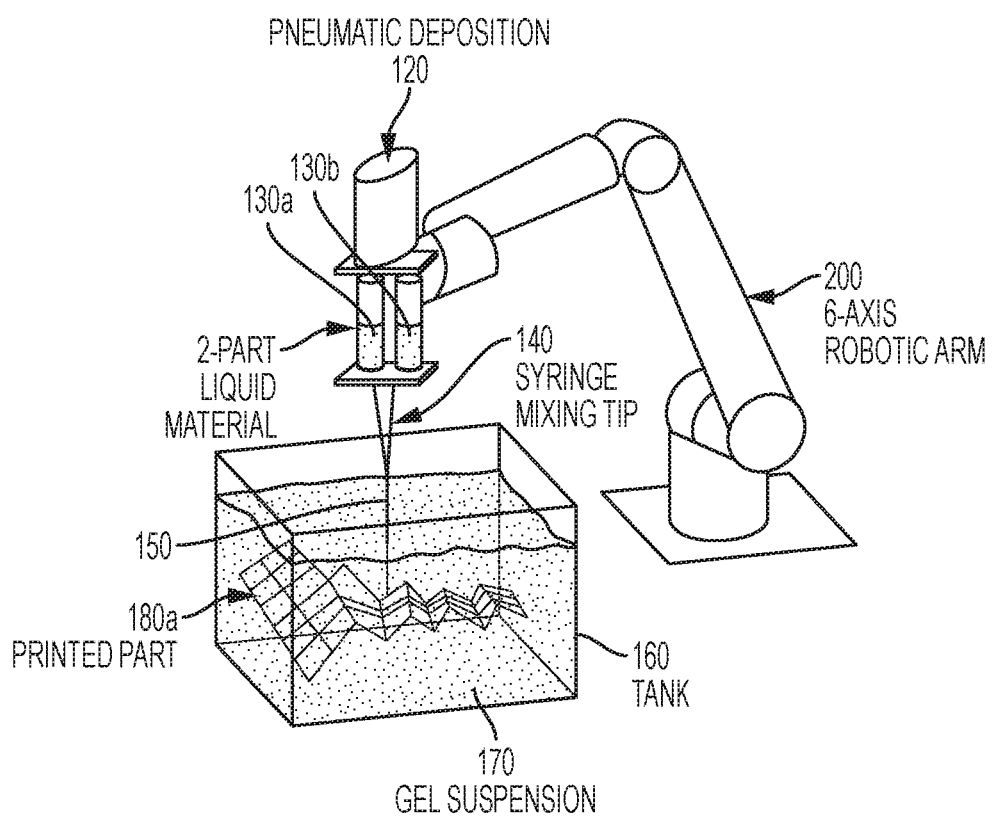
FIG. 2 illustrates a 6-axis robotic arm with a two-component mixing deposition system printing a 3-dimensional part in a gel suspension.

FIG. 1 is an illustration of a three-axis gantry-style machine 100 used with a two-part material. An arm 110 is affixed to the gantry system 100 such that the arm can be moved in the x-, y-, and z-axes, as indicated. In this particular embodiment, pneumatic deposition can be provided through pneumatic control system, which includes a chamber 120 for exerting force on pistons 126a and 126b (see FIG. 3). Two chambers 130a and 130b are provided that hold two different materials. These materials are mixed in mixing tip 140 and deposited through nozzle 150. Container or tank 160 holds a gel 170. As arm 110 moves, nozzle 150 moves through the gel and the two materials are extruded into the gel from chambers 130a and 130b to form three dimensional object (printed part) 180a. FIG. 2 is an illustration of a six-axis robotic arm 200 with a two-part material. The remainder is substantially similar to FIG. 1.

Figure 3:
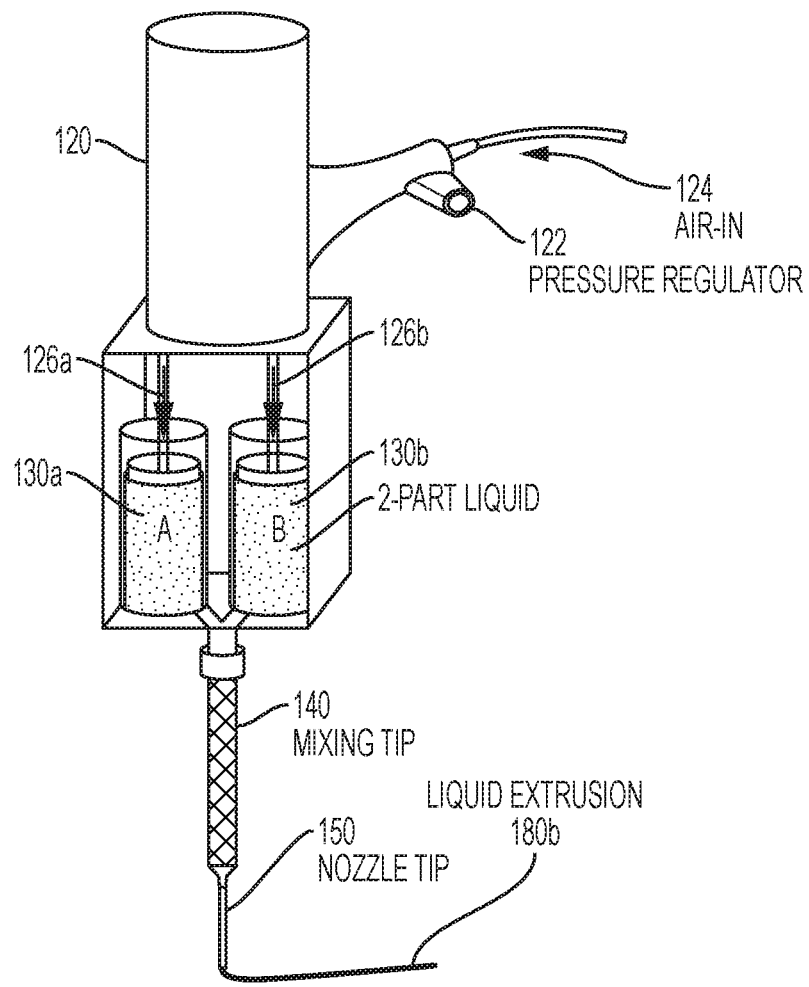
FIG. 3 illustrates the deposition system with two-component solidifying material that is pneumatically controlled to flow through the mixing tip for thorough mixing and extrusion out the nozzle.

FIG. 3 is an illustration of a deposition system for a two-part material that is pneumatically controlled to flow through the mixing tip. Air enter through tube 124, passes through pressure regulator 122, and enters into chamber 120, whereby the air provides a downward force on pistons 126a and 126b to force material out of chambers 130a and 130b, respectively. A solidifying material (e.g., a liquid) 180b is extruded through the nozzle tip 150.

As an alternative to the pneumatic deposition illustrated in FIG. 3, an electrically-activated screw deposition system can be used. For example, a motor can be used to exert downward force on pistons 126a and 126b.

Figure 6:
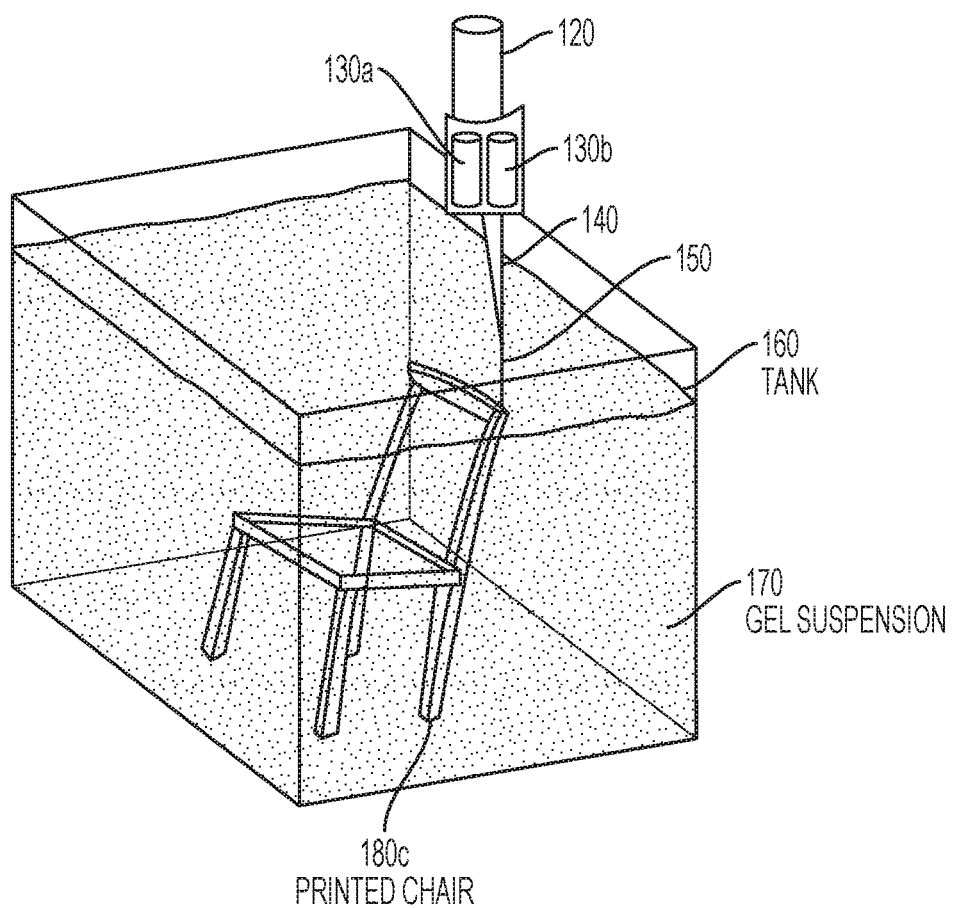
FIG. 6 illustrates a large tank of the gel suspension medium that prints a full-scale chair, suspended in 3D space.

FIG. 6 is an illustration of use of the methods described herein to make a chair 180c.

1. Deposition of Solidifying Materials
1.1. Materials

The methods described herein use a deposition system to deposit solidifying materials of varying quantities and viscosities. The methods are unique compared to other additive manufacturing processes because they allows for easy liquid material flow/deposition, faster printing speeds and the use of industrial-grade materials. In some embodiments, the solidifying material is a single component. In other embodiments, the solidifying material is two separate compounds that co-polymerize.

To date, a variety of plastics, foams and rubbers that are either one-part or two-part air-cured or chemically-cured materials have been tested. Most other processes rely on powder material with adhesive binders, powders with selective sintering, UV-curable polymers or hot-end filament extruders which inherently limit the materials available and the final material properties of the printed structures. The methods described herein can be used to print with industrial-grade materials, such as polyurethane (PU) rubber, foam and plastics, resins, silicone, biological materials, liquid wood pulp, concretes, liquid metals or any other solidifying material, which greatly broadens the possibilities for industrial printing applications.

Examples of foams include urethane and silicone foams. As used herein, foam refers to a material having trapped pockets of gas in a liquid or solid. Foams are typically deposited in a liquid form, and then solidified.

Examples of plastics include chemically-cured plastics, such as urethanes, acrylics, and poly(methyl methacrylate), as well as radiation-cured plastics and moisture-cured plastics.

Examples of resins include epoxy resins, phenol-formaldehyde resins, anaerobic resins, and cyanoacrylates.

Examples of silicones include addition and condensation-cured silicone rubbers with a hardness ranging from Shore 00-10 to Shore 60A when solidified.

Examples of urethane rubbers include materials with a hardness of ranging from Shore 10A to Shore 90D.

Examples of biological materials include bacteria, antibodies, lignin, growth media, yeast, cellular matrices, eukaryotic cells, non-eukaryotic cells, fungal medium, seed/plant growth.

Examples of liquid wood pulp include cellulose, lignin and other paper fiber mixes with both natural and synthetic fibers.

Examples of concretes include Portland cement or other hydraulic cements that harden due to a chemical reaction with water.

Examples of liquid metals include metals and alloys that have a melting point below about 100° C., such as field's metal, wood's metal, and rose's metal.

The methods do not require layer-by-layer deposition. Rather, the nozzle can move and extrude in any orientation in 3-dimensional space. As a result, the final printed product can have a much stronger and more uniform material consistency and surface finish than products resulting from layer-based printing processes.

1.2. Deposition

Figure 5:
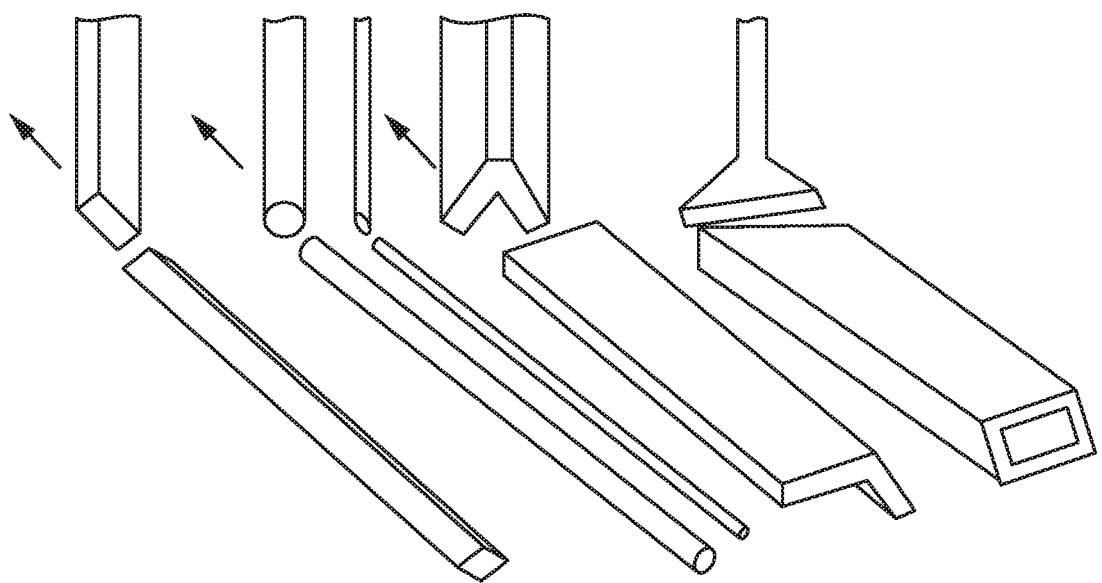
FIG. 5 illustrates a variety of nozzle geometries, sizes and the resultant printed path.

The methods described herein can use a syringe-type nozzle having an opening with a wide variety of shapes and sizes. The methods can also use a two-part liquid extruder that can extrude input materials at a ratio of 1:1, 2:1, 1:2, or other ratios. The nozzle sizes and shapes can accommodate different viscosities and different extrusion shapes or features sizes. For example, a more viscous material may require a larger nozzle and a higher pressure while a less viscous material can use a smaller nozzle and lower pressure. The extrusion pressure can be created with either pneumatics or mechanical actuation. Both actuation techniques can be controlled to precisely deposit the desired amount of liquid, stopped to eliminate residual liquids from extruding, or even potentially reversed to remove material in a form of physical deletion. The nozzle size can also increase the feature size of the printed part and allow for increased resolution, or increase the material quantity and speed to decrease the resolution. The speed of the deposition, size of the nozzle and the pressure in the cylinder are interrelated process variables. For example, to print faster, either the nozzle size or the pressure can be increased; otherwise, the volume of the material extruded per unit distance traveled by the nozzle decreases as the nozzle speed increases. In other words, varying the nozzle size or applied pressure can influence that rate at which the solidifying material is extruded through the nozzle, and therefore the rate at which the solidifying material is deposited. The shape of the nozzle opening can also vary to create different effects in the printed part, resembling a 3-dimensional calligraphy technique. Nozzles having circular-shaped, square-shaped, diamond-shape, V-shaped, U-shape, C-shape or virtually any other shape nozzle can be used to create different feature profiles. Examples of nozzle shapes are illustrated in FIG. 5. Any of the components can be used interchangeably in the system, or simultaneously. For example multiple nozzles can be used simultaneously to deposit two different materials at the same time. Or, different nozzles can be swapped out with a tool-changer to allow for the creation of a single, complex design with different feature sizes, materials and/or profiles.

A mixing tip 140 can also be used to thoroughly mixes a two-part solidifying material for chemical curing. The liquid materials can have a variety of cure-times from a few seconds to minutes or hours. The liquid material can also have a variety of final-cured properties such as high stiffness (e.g., acrylonitrile butadiene styrene (ABS) plastics); elasticity (e.g., rubbers); expanding, flexible, or rigid foams; solubility (liquids); brittleness; high-temperature resistance, or theoretically any other property. The liquids can also be virtually any color and viscosity with the use of fillers and color additives. All of these properties can be varied with independent cartridges, continuous-fill mechanisms to change the properties on-the-fly, multiple-nozzles for multimaterial printing or tool-swapping to allow for different materials in different locations.

2. Gelatinous Printing Media 2.1. Composition

A gel is used as the media within which the solidifying material is deposited. When the solidifying material is deposited, the gel supports the solidifying material such that the solidifying material is suspended within the gel.

A wide variety of gels are suitable. One particular example of a gel that has been used is a neutralized polyacrylic-acid (carbomer 940) gel. Between 1% and 0.25% by weight of carbomer 940 is thoroughly mixed in water such that no clumps remain. At this point the mixture has a low viscosity and a low pH. A solution of sodium hydroxide (NaOH) in water is incrementally added to the carbomer mixture and slowly stirred as to avoid air bubbles until the pH is neutralized. At this point the mixture transforms into a thick gel.

Adjusting the pH can adjust the viscosity of the gel, which allows the gel to accommodate and support objects of differing density, as discussed in the following section.

Adjusting the viscosity of the gel also influences how the nozzle passes through the gel as well as features of the printed structure. For example, if both the gel and solidifying material have a low viscosity, then the solidifying material may not remain in precisely the location where it is deposited. Increasing the viscosity of the gel can ensure that the deposited solidifying material remains within the path where it was deposited rather than flowing through the gel. Alternatively, in some embodiments, the viscosity of the solidifying material can be increased if the viscosity of the gel is too low.

2.2. Controlling Buoyancy of Objects

The amount of carbomer 940 used in the gel affects the subsequent suspension of foreign materials, liquid or solid.

A higher percentage of carbomer results in a gel with higher viscosity and shear stress. In this condition the gel is able to suspend materials with densities much lower or higher than its own. At a rate of 1% carbomer by weight, the gel is able to suspend a ¼ inch lead sphere.

A lower percentage of carbomer results in a gel with lower viscosity and shear stress. In this condition the gel is unable to suspend materials with densities much lower or higher than its own. At a rate of 0.25% carbomer by weight, the gel is unable to suspend a ¼ inch aluminum sphere.

The gel composition can be modified so that it is suitable for formation of the desired object. Typically, the gel can have a viscosity between about 20000 centipoise (cP) and about 50000 centipoise (cP).

2.3. Self-Healing

A gel can self-heal in that after the nozzle passes through the gel, the gel reforms to close the gap in the void area where the nozzle has passed. As a result, air pockets within the gel are minimized. A lower shear stress (slower nozzle speed) permits the gel to self-heal quickly as the nozzle passes through. As a result, deposition of solidifying material in lower viscosity gel better maintains the form of the deposition nozzle orifice. High viscosity gel requires more time to self-heal. As a result, liquid material is able to flow into the cavity left by the tool before the gel is able to self-heal. This effectively elongates circular depositions into a teardrop shape. Thus, the shape of the liquid material varies in proportion to relative viscosity of the gel and speed of the nozzle passing through.

3. Fabrication Machine 3.1. Gantry-System

The liquid extrusion process within the gel suspension can be precisely controlled with at least a three-axis CNC machine. With a three-axis, gantry-style machine, the cartridge and nozzle are attached to the Z-axis, and three-dimensional structures can be printed within the gel. The nozzle can move freely in all three linear dimensions (x-, y-, and z-dimensions), however the nozzle cannot rotate around the z-axis (when used on a 3-axis machine). Typically, the printed part is constrained to 3-dimensional geometries with vertical nozzle orientations.

A five-axis gantry-style machine can also be used. In a five-axis machine, the nozzle can move in all three linear dimensions (x-, y-, and z-dimensions), as well as rotate on the A- and B-axes. Since the nozzle can rotate, the solidifying material does is not necessarily dispensed from a vertical orientation.

3.2. Industrial Robot Arm

In other embodiments, a six-axis industrial robot can be used to move the nozzle through the gel. Typically, a six-axis industrial robot allows for rotation along six different axes. As a result, the nozzle can be oriented in a wide variety of directions, allowing for printing sideways or rotating the nozzle as it moves in space. Similarly, greater freedom over the orientation of the robot and the relationship to the printing axis is allowed.

3.3. Other Machines

Other deposition machines are also possible like "delta" robots, cable bots, or even distributed printing processes with autonomous robots. This process does not require an extremely specific machine, rather it can accommodate just about any computer numerically controlled (CNC) machine that can move in three dimensions with multiple axes of control.

3.4. Scale

Both of these methods can be scalable to large (many cubic meters) or small (cubic millimeters) print volumes with either high precision and/or high-speed depending on the application. If a small part with high precision is needed, a gantry-style machine can be used with extremely precise syringe tips in a small gel volume. Conversely, if a very large-scale structure is needed, a large gantry-machine (10's of meters), or large industrial robot (5 meters+) can be used. Theoretically there is no limit to the size of the machine, however a large gel-bath is required and as the scale increases, the amount of gel required and the size of the container increases. For industrial products on the order of millimeters to multiple meters, this process is very viable and may provide an extremely fast and precise printing process with industrial-grade materials.

3.5. Speed & Multiple Machines

The outlined fabrication machines can operate at slow speeds or fast speeds, depending on the application, the time constraint or the features of the printed part. Typically, the robot arm controlling the nozzle will need to move more slowly for smaller parts and for smaller features of a part. For larger parts and larger features of parts, the robot arm controlling the nozzle can move more quickly. Alternatively, multi-robot printing processes can be used where large features are created with one arm and smaller features are created simultaneously with another arm. This can also allow for different materials or interlocking parts, or other features that would not be feasible with a single machine.

4. Speed

4.1. Support Material

The present invention can be far faster than existing printing process for a number of reasons. The first element that dramatically increases speed is the elimination of extra design material for support. Since the viscous gel can support the deposited material, there is no need for a printed support material like FDM, SLA or many other processes. This dramatically decreases the amount of material that needs to be printed, the time it takes to print, and also the time to remove the excess material from the printing. For example, a diagonal part with overhanging features can be printed directly in 3-dimensional space without the need for a support wall or column.

By removing this limitation, extremely complex structures can also be printed that would not otherwise be possible with other printing processes that require supports. For example, a structure that is hollow, but has a complex shape within the hollow cavity would be difficult to build in other processes because the support material would need to fill the cavity of the printed part and span from one printed part to another. This extra material may not be possible to remove and may limit the possible complexity of the shape. In an SLA or powder-based printing processes, sometimes the support material can be trapped within the cavity and dramatically increase the amount of material that a part requires.

4.2. Post-Printing-Process

By printing with chemically or air-cured solidifying materials within a viscous gel, the methods described herein reduce or eliminate complex and time-consuming post-processing. SLA printing processes typically require a support removal step, which can require manually breaking off the support structures. There is also a cleaning process in an alcohol bath to remove the uncured polymers. These steps can be potentially toxic, costly and extremely time consuming. FDM and Polyjet printing typically involve a support-dissolving step, where the part is put in a bath to remove the support material. This can also be toxic and extremely time consuming. After printing a part for many hours, it then needs to sit in a bath for many minutes or hours while the supports are removed. In powder-based printing processes there is an excavation process that is very messy and time consuming where the user needs to dig out the part from the powder bath. With the methods described herein, when the part is printed it can be immediately cured (or time-delayed depending on the material selection), and then it can be immediately removed from the gel by simply reaching in and taking out the part. The part can then be simply sprayed with water to remove the excess gel and it is finished, ready for use. This simple post-printing-process can dramatically increase the application of 3D printing in industrial settings, reduce the hazards and allow for printing to become more accessible to a wider audience and increase the speed of the post-process.

4.3. Layer Printing vs. Spatial Printing

With the spatial liquid deposition in the viscous gel media, any complex structure can be printed directly in three-dimensional space without slicing and layer-based printing software file preparation steps.

In contrasts, layer-by-layer processes requires fairly complex software and produce large file sizes. The slicing process also frequently increases the failure-rate or the surface roughness of the printed part. Because the complex 3-dimensional model needs to be algorithmically reconstructed with 2-dimensional paths, features can be left out, the path can be incorrect or it can reduce the resolution of the part due to the layer-by-layer material texture. Similarly, this layer-by-layer process dramatically decreases the strength of the printed part due to inhomogeneity. The methods described herein do not have a layer-by-layer printing process and can create completely homogenous cross sections within a printed path in any orientation in 3-dimensions.

Similarly, in the methods described herein, a printed part can be extremely fast to print as compared with layer-by-layer processes. With layer-by-layer printing, the time of printing can be calculated by the linear length of each 2-dimensional path times the number of z-height slices. This dramatically increases the time it takes to print each layer. In our process the nozzle can print in any orientation with any feature size and does not need to print layer-by-layer, dramatically increasing the speed and feature possibilities of a printed part or object.

5. Usage

5.1 Printing in Three-Dimensional Space

The methods described herein allows for objects at small or large scales to be printed reminiscent of 2-D drawing or sketching yet in 3-dimensional space. In some embodiments, the nozzle can be manually moved through the gel by hand without aid of a multi-axis machine. In some embodiments, the robotic arm or gantry-style machine can be manually moved through the gel by hand. Manual movements of the robotic arm or gantry-style machine can be recorded by software as the arm or machine are moved, thereby creating a recording of a movement that can be replayed for future automated production. In other embodiments, the gantry-style machine or robotic arm can be controlled with a controller.

In some of the methods described herein, the structure to be fabricated can be sent to the robot arm as a curve in 3D space. As an example a three-dimensional curve can be generated in modeling software. The curve can be exported as a series of points in 3D space that the machine will follow during the printing process. The output of the modeling software is typically in machine code (e.g., Gcode, ShopbotCode, URCode, or a variety of other types of code files linked with the specific CNC machine that is being used). This process eliminates the need to use an STL file (or mesh geometry file) that is usually exported from modeling software and subsequently imported into a slicing software that slices the STL/Mesh geometry into layers that create tool paths for the machine to follow, layer-by-layer. The slicing software generates the machine code for a typical printer. In methods described herein that involve the use of a multi-axis machine, the slicing step is not necessary, and the machine code is generated from a series of 3-dimensional points in space based on the original 3D curve. The machine code can include other parameters and values. For example, the machine code can include parameters that increase or decrease the air pressure (e.g., to turn the air pressure on or off); to adjust the speed of the machine (e.g., to adjust the speed of the nozzle as it is moving through the gel); and to adjust the orientation of the nozzle as the machine moves the nozzle through the gel.

When connected with design software, a modeling tool or VR headset, the methods described herein can allow for a designer to sketch and design in mid-air while simultaneously printing at the same speed and same scale, within the gel. This 1:1 design to production speed and length-scale has not been realized before due to time constraints inherent with physical fabrication. Most fabrication processes, even for quick sketch models, take significant amounts of time and therefore cannot be as fast as sketching. With this technology a printed part can be created at the same speed that a robot or a human moves their arm through the air.

5.2 Printing onto Other Objects

If the fabrication machine (gantry or robot) picks up a physical object and places it into the gel, the machine can then liquid print onto, around or within the physical object. This capability allows for sequential printing of materials with a variety of properties in one build. Using the fabrication of a chair as an example, a structure (in this case, a metal structure) produced by another fabrication process can be placed within the gel. The back of the chair, which typically is made of a soft rubber material, can be printed around the placed metal structure. Next, the robot can switch to printing a foam material as the seat cushion of the chair, connected directly to the metal structure. This process can incorporate fastener details like screws, bolts or other connectors and can allow for hybrid fabrication processes. Many physical objects (flexible or rigid) with different materials can be deposited or placed within the gel acting as substrates for further build processes. Even a textile can be placed in the gel and printed onto.

Figure 7:
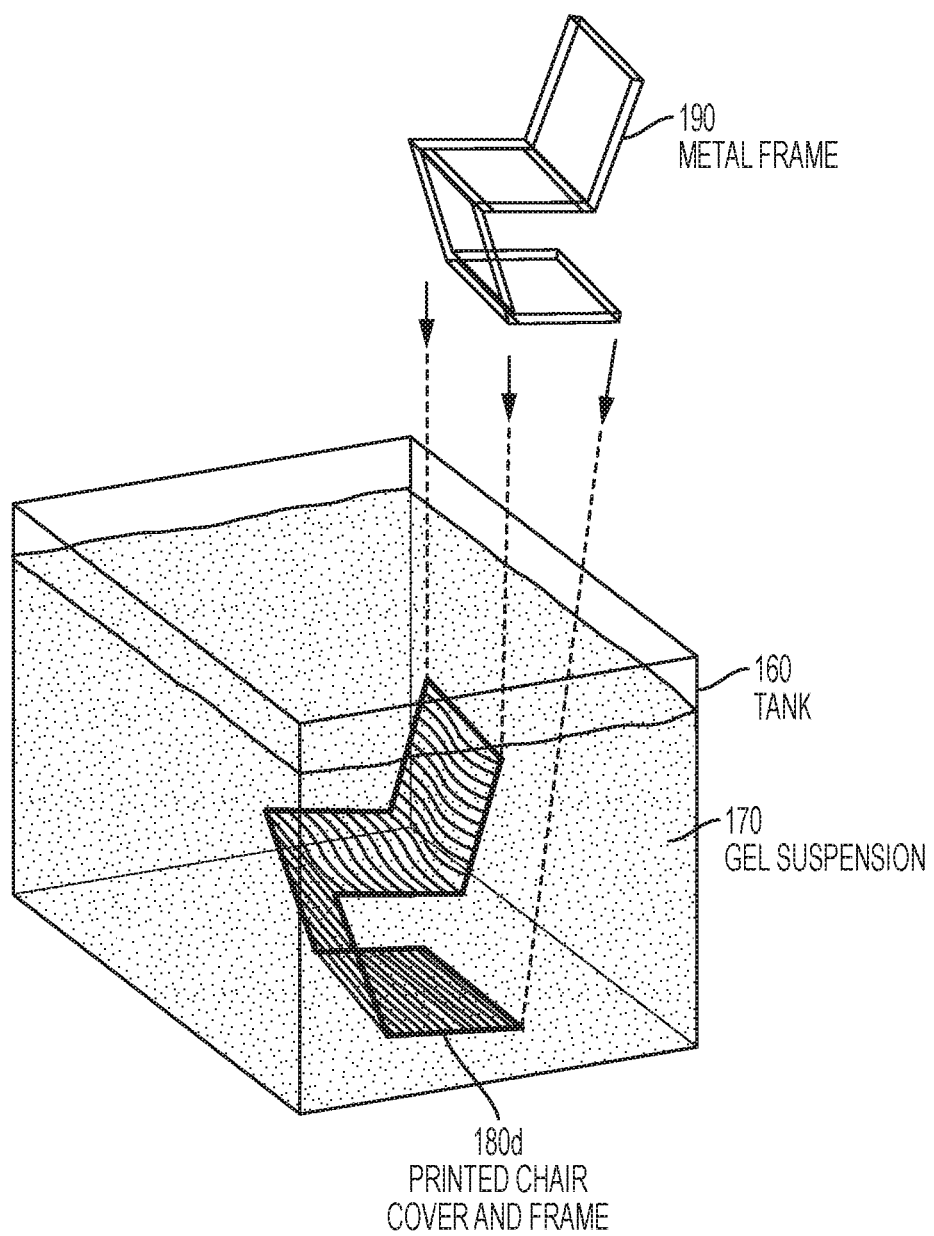
FIG. 7 illustrates a printing portions of a chair onto and/or around a metal frame inserted into a large tank.

FIG. 7 is an illustration of using the methods described herein to fabricate a chair. A metal frame 190 can be placed into the tank 160 of gel 170. The printed chair cover and frame 180*d* can be printed onto and/or around the metal frame 190 to produce the spanning flat surfaces of the chair. This process allows for hybrid printing scenarios incorporating other parts (e.g., industrially-produced parts) in the gel suspension.

5.3 Cure-Time

The printed solidifying material can be designed to cure extremely quickly or slowly, depending on the application. A faster cure time can reduce the overall fabrication time while a slower cure time can allow for more thorough bonding when printing intersecting paths. A slower cure-time can also enable bonding of the liquid printed structure with physical objects that have been placed into the gel 5.4 Complex Tool Paths Another potential advantage of this technique is the possibility of fully interlocking, 3-dimensional parts being made without support material or filled cavities. For example, printing a woven or knit structure may now be possible utilizing multiple robots that deposit liquid simultaneously, or by complex tool paths that would otherwise not be possible. With a 6-axis industrial robot, complex tool paths can be used, almost like calligraphy, with different nozzle extrusion orientations. Another possibility is printing underneath, next to or on top of other printed/physical objects within the gel.

5.5 Post-Process

Different forms of post-curing can be incorporated such as UV- or temperature-sets to change the properties of the material. After removing the part from the gel bath, it can be easily washed-off with water to remove excess gel, or coated with some material to strengthen it, color the part, further cure the part or any number of post-processing capabilities. For example, if a ceramic material is printed within the gel, or a slurry of wood or metal, the printed part may cure within the gel, then be removed and placed into an oven for post-processing. Such a capability can greatly increase part strength, such as through a post-printing firing or sintering processes as used in ceramics and metal production, or a number of other interesting material capabilities.

5.5 Material Usage

Due to the removal of printed support material and the truly 3-dimensional nature of this printing process, much less material can be used for a printed part. This process does not require baths or beds full of powder or liquid resins. Similarly, the layer-based process and built-up printed support materials are quite wasteful in the total amount of material used compared with the material needed for the final part. In the methods described herein, it is not necessary to waste material.

6. Advantages & Improvements Over Existing Methods

This technology offers significant improvement over existing methods of three-dimensional printing, including; SLA, SLA, FDM, Polyjet and powder-based printing. To date, three-dimensional printing has not made a significant impact in industrial manufacturing processes because of: 1) long printing times compared with injection molding or other manufacturing processes; 2) relatively small build volume limiting realistic applications; and 3) the availability of only low-quality printable plastics and other materials, the properties of which do not compare with industrial materials. The methods described herein dramatically improve upon each of these areas.

Since the methods described herein do not require support material to build overhangs or complex 3-dimensional structures, the structure can be made significantly faster. FDM, Polyjet and SLA technologies require supports that significantly increase the time required to print and the time after printing due to the need to remove the supports either manually or through dissolution. Without supports, the methods described herein can print the same complex three-dimensional shapes at the same time as reducing the need for additional unnecessary material, unnecessary time for printing and unnecessary post-printing processes. Once a structure is printed and the solidifying material solidifies (e.g., cures), the structures can be removed from the gel, simply washed off with water, and then they are finished. The methods utilize the gel's material structure to suspend the print in 3-dimensional space and allows for non-layer-based printing where the nozzle can move freely in all 3 axes at any time.

This technology also drastically increases the speed of printing by eliminating the requirement to print in successive layers. Nearly every printing process available today requires individual layers to be printed, layer-after-layer. This drastically increases the time required to print a tall or complex 3-dimensional form and requires sophisticated digital "slicing" techniques, producing large file sizes. For example, if a wireframe structure was to be printed using FDM, SLA, SLS, powder-based printing or polyjet, it would need to be sliced with many layers and then printed in linear paths at each layer. The edges of the wireframe structure would also need to have support material printed underneath due to their cantilever and unsupported shape. In the methods described herein, these lines can simply be drawn in three-dimensional space, eliminating the support material and eliminating the slices. Another aspect that increases the speed of printing compared to other free-form or in-air three-dimensional printing processes is the speed of extrusion. Other processes require that the material be cured or hardened before the machine moves to the next layer or continues to move the nozzle. This drastically decreases the speed at which the robot or printer can move. In the methods described herein, the material is suspended in the gel in three-dimensional space, and therefore the nozzle can continue moving quickly and extruding materials that are suspended behind the nozzle path and solidified (e.g., chemically cured). Because of these factors, the speed of printing can likely be increased by many orders of magnitude compared to traditional printing processes.

As compared with traditional methods of 3-dimensional printing, the methods described herein are also scalable from very small-scale, high resolution to large-scale. Since the process is dramatically faster than any other methods, much larger structures can be built in less time. For example a 6"×6"×6" cube of material may require 24-48 hours to print on an SLA machine while it can take a few minutes in the methods described herein. The methods can also scale-up by using larger tanks of gel and larger industrial robots or gantry machines and allow very large structures to be produced extremely quickly. The speed and scale of the print may now be able to be compared with other industrial processes like injection molding or machining. Especially if the assembly time of a traditional product is taken into consideration, the methods described herein, which may not require any assembly since the entire product can be printed simultaneously, may drastically change manufacturing scenarios.

One of the most significant advances over traditional three-dimensional printing processes is the improvement in material properties. Because the method involve printing a solidifying material in a liquid or molten state and chemically curing that material, real-world, industrially produced materials can be used. Some examples of materials that can be used include polyurethane (PU) rubber, foam, plastics or any other liquid or molten material. In FDM printing a filament is produced, which then needs to be heated and extruded in a liquid form that then cools and hardens into the three-dimensional structure. This process limits the types of materials available for use, and the layered nature of the FDM printing process dramatically reduces the structural integrity of the printed part compared to injection molding. In SLS printing, the materials are even more limited because they need to be made into powders that then require sintering, which limits the range of available materials. The methods described herein use the same materials that are available today in many industrial manufacturing processes, and the materials do not require heating, sintering, or hot-extrusion; rather they are chemically or otherwise cured (e.g., photoinitiated polymerization). Similarly, the methods do not rely on successive layering, the consequence of which is that the parts can be as strong as parts made through traditional industrial processes. The methods described herein can also be used to print liquid slurry woods, biological materials, low-temperature liquid metals, cements or other types of materials that can be extruded into the gel substrate.

7. Applications

The methods described herein can be used to fabricate a wide variety of products. Examples include apparel and sports equipment; fabrication and manufacturing; aviation and automotive; furniture and interior products; architecture, engineering, and construction; and toys and consumer goods. The following are some examples of products within these categories.

Apparel & Sports Equipment: Printing 1:1 sports equipment (bikes, boards, boots, shoes, helmets, pads, etc.); Printed textiles; Marketing/commercial/PR applications with an innovative new process for in-store applications or high-tech appeal; Potentially as fast, or faster, than existing manufacturing processes, highly customized, industrial-quality materials (foams, rubbers, plastics), large-scale or small-scale parts; New design process with physical 3-dimensional 1:1 size/speed sketching.

Fabrication & Manufacturing: Large-scale tooling, prototyping, and fixturing; Potentially as fast, or faster, than existing manufacturing processes, highly customized, industrial-quality materials (foams, rubbers, plastics), large-scale or small-scale parts; Hybrid approaches with multiple fabrication processes (i.e. welded or cast metal parts inserted into the gel to receive a liquid printed part within/around/on top of the metal part).

Aviation and Automotive Applications: Large-scale printed parts for interior applications (panels, seats, shades, dashes, ceilings, floors); Medium-scale printed parts (seat cushions/structures, engine components, brackets, connectors); Large-scale printed parts for exterior panels; Tooling, prototyping, fixturing; Potentially as fast, or faster, than existing manufacturing processes, highly customized, industrial-quality materials (foams, rubbers, plastics), large-scale or small-scale parts; New design process with physical 3-dimensional 1:1 size/speed sketching Furniture & Interior Products: Large-scale printed parts for interior applications (screens, installations, etc.); Medium-scale printed parts (seat cushions, seat structures, seat back/textiles, tables, desks, stools, shelves, etc.); Tooling, prototyping, fixturing; Marketing/commercial/PR applications with an innovative new process for in-store applications or high-tech appeal; Potentially as fast, or faster, than existing manufacturing processes, highly customized, industrial-quality materials (foams, rubbers, plastics), large-scale or small-scale parts; New design process with physical 3-dimensional 1:1 size/speed sketching Architecture, Engineering & Construction: Large-scale tooling (blades, concrete form-work, support structures); Final structures (walls, surfaces, skin/panels, 1:1 details);

On-site fabrication process during construction due to speed/scale; New design process with physical 3-dimensional 1:1 size/speed sketching.

Toys and other Consumer goods: Printing 1:1 consumer goods/toys (bikes, boards, boots, shoes, helmets, pads, etc.); Potentially as fast, or faster, than existing manufacturing processes, highly customized, industrial-quality materials (foams, rubbers, plastics), large-scale or small-scale parts; New design process with physical 3-dimensional 1:1 size/speed sketching Incorporation By Reference; Equivalents The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A method of making a three-dimensional object, the method comprising:
   a) positioning a nozzle within a carbomer gel inside a container of carbomer gel;
   b) changing the position of the nozzle within the carbomer gel while depositing solidifying material which becomes part of the three-dimensional object, through the nozzle, whereby the carbomer gel supports the solidifying material at the position at which the solidifying material is deposited, which is suspended within the carbomer gel; and
   c) solidifying the solidifying material in the carbomer gel to form a solid material, the solid material being a three-dimensional object,
      wherein the carbomer gel does not scar, and
      wherein the carbomer gel is a water based gel;
   wherein the nozzle is a first nozzle, the solidifying material is a first solidifying material, and the solid material is a first solid material, the method further comprising:
   d) positioning a second nozzle within the carbomer gel inside the container of carbomer gel;
   e) changing the position of the second nozzle within the carbomer gel while depositing a second solidifying material through the second nozzle,
      whereby the carbomer gel supports the second solidifying material at the position at which the second solidifying material is deposited, and
      whereby depositing the first and second solidifying materials is performed so that the first and second materials contact each other in deposited state; and
   f) solidifying the second solidifying material to form a second solid material,
      whereby the first and second solid materials are joined together as the three-dimensional object.

2. The method of claim 1, wherein the first and second nozzles have tips with different shapes.

3. The method of claim 1, wherein the first and second solidifying materials are different.

* * * * *